United States Patent [19]
Summerfield et al.

[11] 3,826,461
[45] July 30, 1974

[54] VALVES

[76] Inventors: Francis Summerfield, 9 Dunstan Dr., Adel, Leeds LS16 8EW, Yorkshire; Alexander Unthank, 22 Timber Ridge, Doncaster, Melbourne, Victoria 3108, both of Australia

[22] Filed: Nov. 24, 1972

[21] Appl. No.: 309,070

[52] U.S. Cl............................ 251/7, 251/8, 285/55, 285/156, 285/373
[51] Int. Cl............................................ F16l 55/14
[58] Field of Search............ 137/554; 251/375, 4–9, 251/331, 367; 285/66, 71, 55, 197, 423, 155, 156, 373, 419; 138/99

[56] References Cited
UNITED STATES PATENTS

| | | | |
|---|---|---|---|
| 1,108,259 | 8/1914 | Sixma | 285/156 X |
| 1,866,672 | 7/1932 | Salmon | 285/156 X |
| 1,964,123 | 6/1934 | Kaiser | 285/55 X |
| 2,342,192 | 2/1944 | Grigsby | 251/8 |
| 2,560,114 | 7/1951 | Kennon | 285/55 X |
| 2,825,524 | 3/1958 | Fox | 251/8 |
| 3,285,563 | 11/1966 | Clarkson | 251/8 |
| 3,410,517 | 11/1968 | Wall | 251/8 X |
| 3,606,242 | 9/1971 | Lathrop | 137/554 X |
| 3,633,943 | 1/1972 | Ramm et al. | 285/156 X |
| 3,711,633 | 1/1973 | Ghirardi et al. | 285/156 X |

Primary Examiner—Henry T. Klinksiek
Attorney, Agent, or Firm—Harrington A. Lackey

[57] ABSTRACT

A pinch valve casing having two passages which in general define a T-shape, the casing being in two identical halves which are pivotally interconnected and can be opened for insertion or removal of a pinch tube. The casing preferably is provided at each end with a removable collar which forms its connection with the casing parts by the closing of the casing and can be removed by the opening of the casing.

10 Claims, 9 Drawing Figures

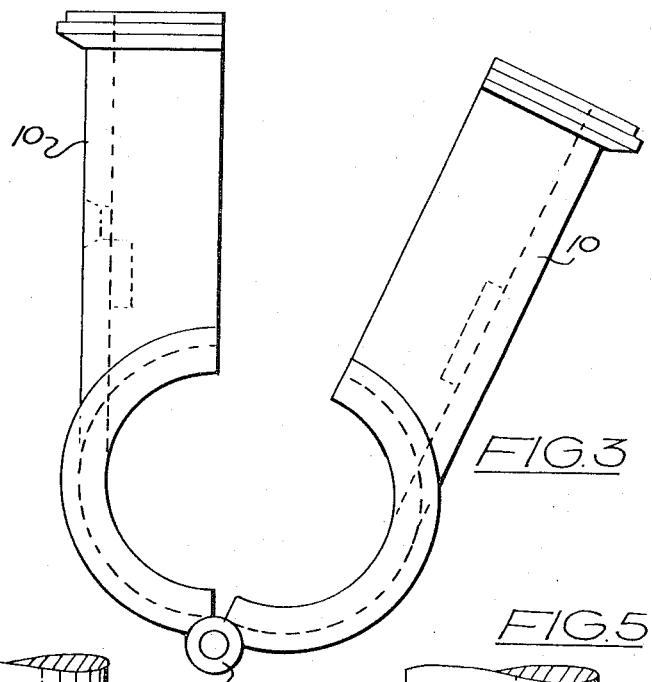
FIG.3
FIG.4
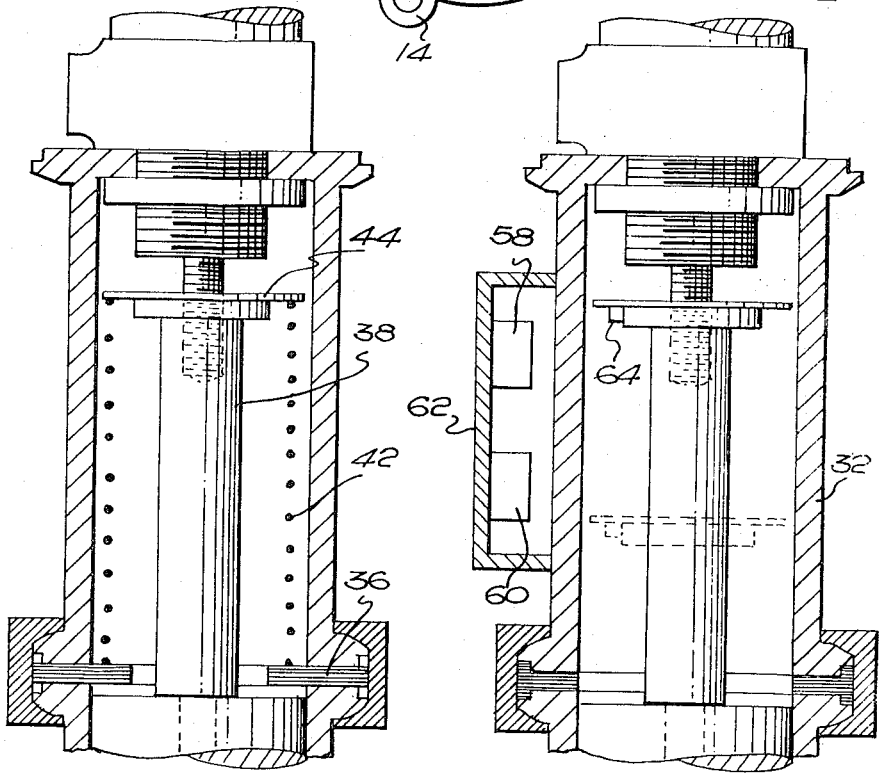
FIG.5

VALVES

This invention relates in general to pinch valves and more particularly to pinch valve casings. A pinch valve comprises basically a casing containing a tube of flexible material through which flows the medium whose flow is to be controlled by the valve, and a movable valve operating means for selectively pinching the tube transversely of its length to close the valve or release the tube to permit the flow of medium therethrough. These valves are most commonly used for controlling the flow of liquids or fluent solid material such as viscous pastes and the like.

The advantage of the pinch valve is that the medium can be kept out of contact with all but the inner wall of the flexible tube, which tube would preferably be selected from materials which are inert to the medium flowing through valve, but it is believed that pinch valves have not been used as extensively as they might have been because casing constructions adopted heretofore have been somewhat elaborate leading to high cost for these valves.

For example, conventional valve casings have been proposed which are comprised of two parts so that the casing can be split to give, amongst other things, access to the flexible tube for replacement and repair. Whilst this concept, in itself, is sound in principle, in practice these casing parts have been connected by bolts and have been dissimilar in shape, so that each casing part has to be moulded or cast individually, requiring separate moulds, which of course is very expensive. Furthermore, upon release of the bolts, the casing parts become physically separated, and may therefore become lost or difficult, on site, to re-assemble.

Another difficulty experienced with conventional pinch valves casings which can be split is concerned with the casing end fittings. These are the fittings or formations which connect, through flanges or other suitable components, or directly to the pipes or tubes carrying the medium which will flow through the valve. As will be understood the end fittings or formations will probably also be split, which gives rise to obvious difficulty in the case of screwed end fittings or formations.

Another limitation of conventional pinch valves, and indeed many other valves, is that the end fittings or formations are of a pre-set size and are therefore connectable only to the pipes, tubes or unions, for which they are designed.

A main object of the present invention is to provide a pinch valve casing of a novel construction substantially divorced from conventional pinch valves.

A further object is to provide a pinch valve casing which is split and which is capable of relatively cheap manufacture and of which the parts remain connected when the casing is open.

A still further object is to provide a pinch valve casing which is adaptable so that with simple modification, it can be connected to unions, pipes or tubes of different sizes or having different threads.

A still further object of the invention is to provide a pinch valve having a casing according to the invention, and also having further advantageous features.

According to one aspect of the invention there is provided a pinch valve casing having two passages which in general define a T-shape, the passage which defines the arms of the T-shape being for the reception of a flexible tube, and the other passage being for the reception of a movable valve closure member so that closure member can be moved to pinch the tube and close the valve, characterised in that the casing is in two parts which are or are adapted to be hinged together so that the casing can in use be opened and the tube removed and inserted easily.

By providing that the casing is in two parts hinged together, the replacement of the flexible tube, when unserviceable or because the valve has to control the flow of a different medium, is a simple and straightforward matter.

Preferably, the casing parts are identical and are formed in the same mould, which feature ensures the minimum mould costs in producing the valve casing.

According to another aspect of the invention there is provided a pinch valve casing having two passages which in general define a T-shape, the passage which defines the arms of the T-shape being for the reception of a flexible tube and the other passage which defines the leg of the T-shape being for the reception of a movable closure member valve so that the closure member can be moved to pinch the tube and close the valve, characterised in that the casing is split lengthwise of the passage defining the arms of the T-shape and the casing parts defined by said splitting being capable of being moved apart to allow removal or insertion of the flexible tube, and also characterised in that there is a removable collar at a location at each end of the said passage defining the arms of the T-shape so as to adapt the casing for connection to a medium carrying pipe, or flange or fitting and which collar can be removed upon the moving apart of the said body parts.

By the above means it will be appreciated that the said collars are replaceable by other collars and use can be made of this to adapt the valve casing for connection to say different sized pipes, clip connections, unions, flanges or different thread pitches. Either or each collar may serve the purpose of a reducer or expander or achieve in use aseptic connections between the bore of the flexible tube and the adjoining pipe at each end.

The invention further provides a pinch valve having a casing as aforesaid, and including a flexible tube in said passage defined by the arms of said T-shape.

The flexible tube may at each end be flanged over the outer end face of the adjacent collar so that in connecting the collar to a pipe end, the flanged portion of the flexible tube assists in forming a gas tight aseptic seal between the valve and pipe end.

The body parts and collars may be moulded in plastics material.

Embodiments of the invention will now be described by way of example, with reference to the accompanying drawing, wherein:

FIG. 3 is an end elevation of the valve body of the valve shown in FIG. 1 with the body partly open;

FIG. 4 is a sectional elevation of part of a valve which is similar to that shown in FIG. 1, but shows a modified spring loading arrangement.

FIG. 5 is a sectional elevation of a valve which is similar to that shown in FIG. 1, and shows an electromagnetic indication means;

Figure 1:
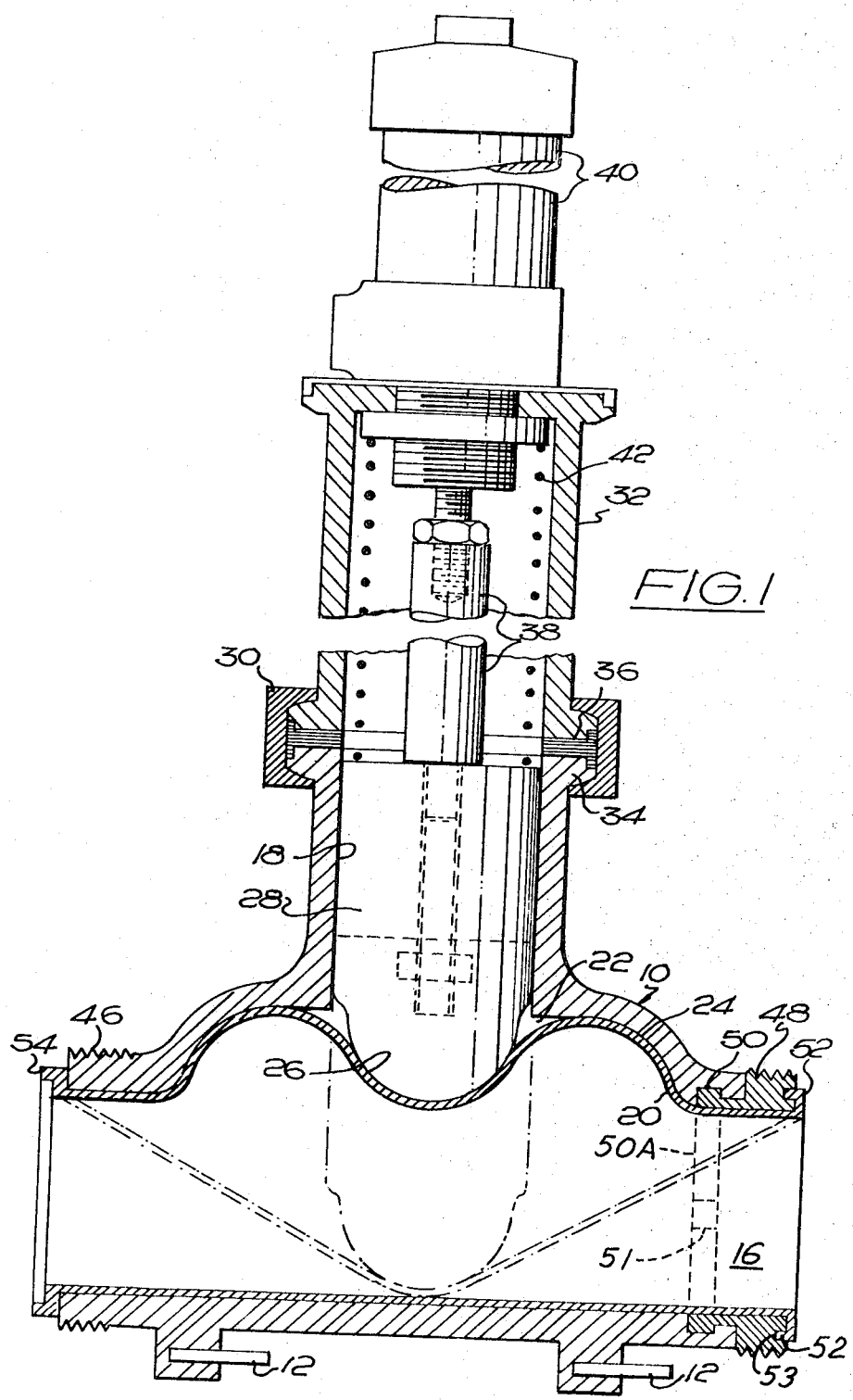
FIG. 1 is a sectional elevation of a valve according to one embodiment of the invention and showing different pipe end connections.

Referring to the drawings, and firstly to FIG. 1, the pinch valve comprises two identical casing body halves 10 which are hinged together on hinge pins 12 defining an axis 14 located in the longitudinal plane of symmetry of the casing so that the body halves 10 can be hinged apart as indicated in FIG. 3 about axis 14.

The two body parts when brought together define two passages or bores lying in T-configuration, the first passage 16 defining the arms of the T and the second passage 18 defining the leg of the T. In passage 16 there is located a flexible tube 20 which conforms generally to the cross-sectional shape of passage 16 and in the example of FIG. 1 the passage 16 is enlarged at 22 where it meets the passage 18 and the tube 20 in this region has protuberances 24 which engage the enlarged portions of passage 16 on opposite sides of passage 18. The region of the tube 20 between protuberances 24 is curved smoothly inwards as indicated at 26 so as to be engaged on its outside by a rounded end piston 28 which is slidable in passage 18.

The valve halves 10 are held together in the closed position by means of a jointing ring 30 which in addition to holding the valve closed also serves to clamp an extension tube 32 having an internal shape which is the same as passage 18 to flanges 34 on the body halves 10. A flexible jointing ring 36 between the end of tube 32 and the said flanges 34 serves to seal the joint between the joint 32 and the valve body in a gas tight manner.

Piston 28 has a piston rod 38 which is connected to the piston rod of an air cylinder 40 mounted on the end of tube 32 remote from the jointing ring 36. A compression spring 42 acts on piston 28 to urge same to a lower or valve closed position indicated in dotted lines in the figure and in which position the piston 28 is displaced downwardly flexing the tube 20 into the condition shown in dotted lines in FIG. 1 wherein the tube is pinched closed by the piston 28. It should be noted here that the protuberances 24 on tube 20 and the general configuration of the tube between and including these protuberances 24 is such that in moving the tube between the open position shown in full lines and the closed position shown in dotted lines there is no stretching of the tube material but merely flexing thereof.

To operate the valve shown, air under pressure is admitted either manually or automatically as desired into cylinder 40 and piston 28 is retracted to the position shown. This particular form of valve construction it will be appreciated is of the "fail safe" type insofar as if the supply of pressure air to cylinder 40 fails or cylinder 40 itself fails then the valve will be automatically closed under the action of compression spring 42. It is a simple matter to arrange for the valve to open in the event of failure of the air supply or cylinder 40 and such an arrangement is illustrated in FIG. 4. In this case the spring 42 acts on a washer 44 secured to the piston rod 38 whilst the other end of the spring acts on a section of a slightly modified form of jointing ring 36. The action of the spring 42 therefore is to urge the piston 28 in an upwards direction tending to open the valve and in this case when cylinder 40 is pressurised the piston is deflected downwardly to close the valve illustrated in dotted lines in FIG. 1.

Figures 6, 7, 8, 9:
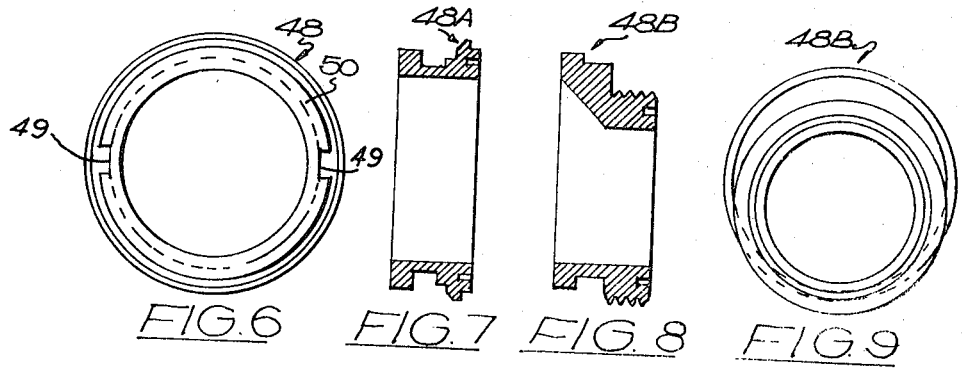
FIG. 6 is an end elevation of one of the collars shown in FIG. 1.
FIGS. 7 and 8 are sectional elevations of modified collar forms.
FIG. 9 is an end elevation of the collar shown in FIG. 8.

It will be noticed that different end arrangements for the connection of the valve to medium carrying pipes are illustrated in FIG. 1. At the left hand end in FIG. 1 the valve connection is indicated simply as a threaded portion 46 on the valve body and on which a screwed collar or union of an adjoining pipe would be threaded in order to seal the valve to the end of an adjacent pipe whilst at the other end of the valve in FIG. 1 there is shown an arrangement which is preferably provided at each end of passage 16 and which comprises a coupling collar 48 which is provided with a rim 50 which locates in a groove 50A defined in the casing parts 10. Rim 50 has radial key slots 49 which are engaged by keys 51 in the groove 50A defined in the body halves to prevent the collar 48 from turning in use. Thus, if the valve is opened as indicated in FIG. 3, then collar 48 can readily be removed and replaced for example by another collar having different sized threads for engagement with a different size of pipe union. The end of the flexible tube 20 is flanged over collar 48 and an extremity 52 engages in a circular recess 53 in the end of collar 48. In connecting collar 48 to an adjoining pipe length the flange over end of tube 20 butts against an adjacent surface to achieve a fluid tight seal whereas in the arrangement in the left hand end of FIG. 1 the annular extension 54 of the end of tube 20 would engage an annular groove on the end face of the adjacent pipe or pipe flange. FIG. 6 shows an end view of the collar 48 whilst FIGS. 7 and 8 show modified forms of the collar 48A and 48B. Collar 48B provides for a reduction in diameter from the diameter of tube 20 to the diameter of a smaller diameter pipe to be connected to the valve. FIG. 9 illustrates an end view of the collar 48B. The collar can of course be made to be a bore size expander instead of a reducer as shown.

Figure 2:
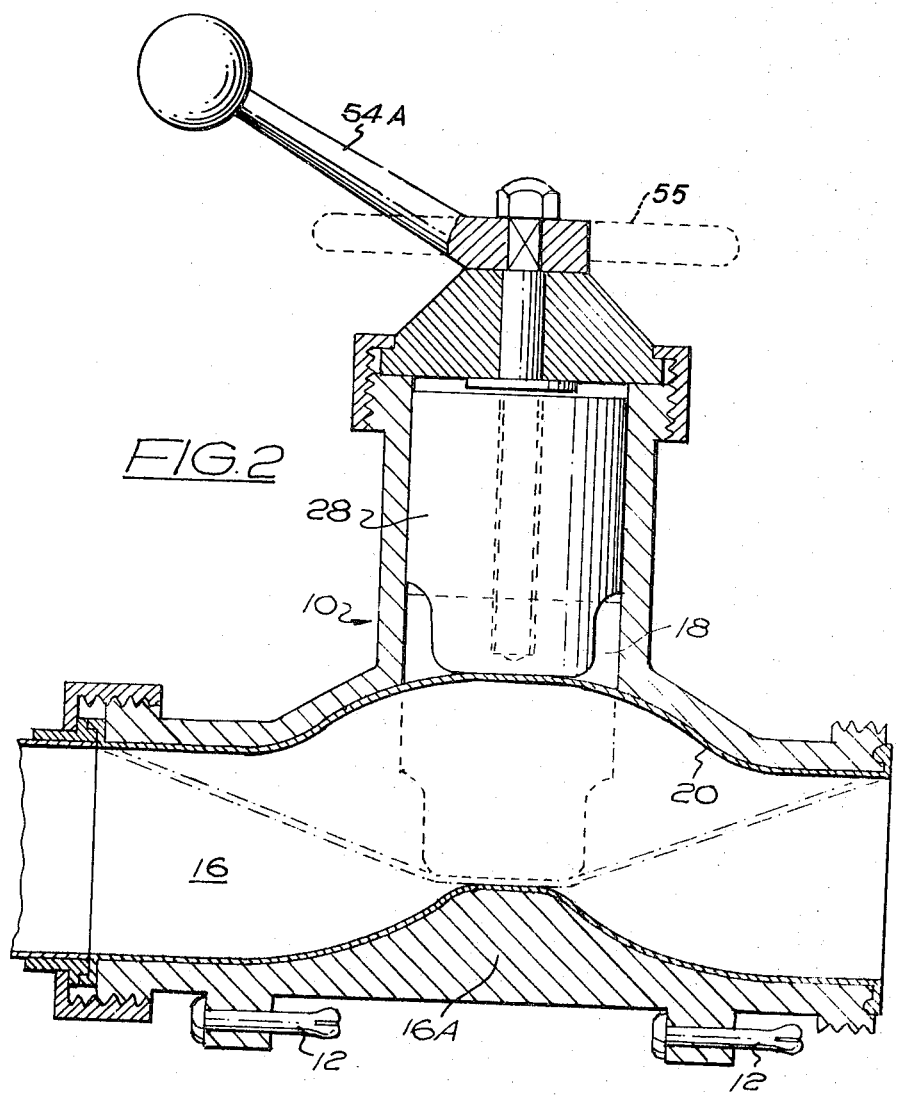
FIG. 2 is a sectional elevation of a valve according to another embodiment of the invention.

In the alternative arrangement illustrated in FIG. 2 the principle of construction of the valve is similar to FIG. 1 in that the valve is constructed from two identical body halves 10. In this case however, the passage 16 is of slightly modified form in that the base of the passage has a raised region caused by enlargement 16A on the body halves, this feature serving to give good drainage of the valve when it does not carry fluid and the piston 28 not only is of a modified shape but is movable up and down by means of a manually operable handle 54A or alternatively by a handwheel 55 illustrated in dotted lines in FIG. 2.

FIG. 5 illustrates how the position of the valve, i.e., either open or closed may be detected automatically and electrically without there being any electrical connections to the moving parts of the valve. This is achieved by utilising two reed switches 58 and 60 which are contained in a sealed casing 62 attached to the tube 32. Electrical connections are taken from the reed switches 58 and 60 and out of the sealed casing 62 to suitable alarm and control means and in order to effect actuation of the switches 58 and 60 the piston rod 38 carries a permanent magnet 64 which can be arranged, upon being brought into alignment with the reed switch 58 and 60, to open or close such reed switch and the opening or closing of either of the reed switches may be used as an indicating warning and/or control means for the valve. This arrangement has a particular advantage that there is no electrical contact between the reed switches and the moving parts of the valve.

In joining the valve to an adjacent pipe, it is desired that the fluid joints be aseptic in that the bore of the tube 20 should form a smooth continuation with the bore of the adjacent pipe. This may be achieved by having the bore of tube 20 identical with that of the adjacent pipe or by means of reducer and/or expander collars as explained previously. Moreover, it is desired that the parts of the valve body be capable of being opened quickly as indicated in FIG. 3 so that the component parts can be removed for cleaning and/or replacement.

The parts of any of the valves can be made in any material rubber, plastics or metal (for example), but of course the material of the flexible tube 20 will preferably be chosen so that it is inert to the fluid medium which is being carried by the tube. In addition, the control of the opening and closing of the tube may be hydraulic or electrical as opposed to the two possible forms shown in the drawings namely manual and pneumatic.

The valve, as an alternative or an addition to the indicator using reed switches as illustrated in FIG. 5, can be provided with a visual indicator to indicate whether or not the valve is in the closed or open position.

By using a number of the valves and perhaps interconnecting them by a control system there can be established any desired flow pattern and the flow pattern can be changed by changing the settings of the valves.

It is preferable that each valve should be constructed so that there is no tendency for any pockets of medium to collect in the valve after the system has been drained. The arrangement of FIG. 2 is particularly good in this respect although the arrangement of FIG. 1 can also be used because the bottom of the passage 16 is straight.

Moreover, in the example shown in FIGS. 1, 4 and 5 where an air cylinder is used to control the valve it is to be noted that there is no possibility of the air entering the fluid medium passage as defined by tube 20 and therefore there is no problem of contamination of the medium by this air.

We claim:
1. A pinch valve comprising:
   a. a casing in the form of a pair of separable mating body parts which together define a hollow T-shaped body, having coextensive arms terminating in opposite end portions and a leg intersecting said arms,
   b. said body having a first bore coextensive with said arms and a second bore coextensive within said leg and intersecting said first bore,
   c. means holding said body parts together,
   d. a flexible tube of substantially the same dimensions as the first bore and located substantially coextensively within said first bore,
   e. means for moving the valve closure member toward and away from pinching engagement with said flexible tube,
   f. a coupling collar for each end portion,
   g. at least a portion of each coupling collar being mounted within the corresponding end portion of said first bore, and receiving an end of said flexible tube,
   h. first interfitting means within the opposite end portions of said first bore,
   i. second interfitting means on each of said collar portions cooperatively engaging said first interfitting means,
   j. said interfitting means being disengageable only upon separation of said body parts for removal of said collars.

2. The invention according to claim 1 in which the separable mating body parts are identical, and further including hinge means for securing adjoining edges of said body parts for swinging movement about a longitudinal axis lying in the plane of symmetry of said body parts.

3. The invention according to claim 1 in which one of said interfitting means comprises a groove and the other of said interfitting means comprises a radial projection adapted to be received in said groove when said body parts are together.

4. The invention according to claim 3 in which said first interfitting means comprises said groove within at least one of said body parts, and said second interfitting means comprises said radial projection.

5. The invention according to claim 4 in which said groove is formed circumferentially in both said body parts, and said radial projection comprises a circumferential rim projecting radially outward from each of said collars fitting within said circumferential groove when said body parts are together.

6. The invention according to claim 5 further comprising a key projecting radially from said groove and a key slot in said rim receiving said key when said body parts are together, to prevent rotation of said collar relative to said body.

7. The invention according to claim 1 in which said flexible tube has at least one end portion flanged over the outer face of the adjacent collar for sealing engagement with an opposed face of the adjacent end of an aligned medium carrying pipe.

8. The invention according to claim 1 comprising means normally urging said valve closure member to an inoperative position away from said flexible tube.

9. The invention according to claim 7 in which each of said collars has an outer end, a circular recess in said outer end, the extremity of the flanged end portion of said flexible tube being received in said circular recess.

10. A pinch valve casing comprising:
   a. a pair of complementary T-shaped mating body halves, each body half being identical to the other body half,
   b. hinge means securing adjoining edges of said body halves for swinging movement about a longitudinal axis lying in the plane of symmetry of said body halves for movement to a closed position forming a T-shaped body, and for movement apart to an open position,
   c. said body halves, in closed position, providing a first longitudinal bore coextensive with the arms of the T-shaped body, having opposite end portions and adapted to receive therein an elongated, substantially coextensive flexible tube,
   d. said body halves, in closed position, further defining a second bore coextensive with the leg of the T-shaped body, intercepting said first bore, and adapted to receive therein a movable valve closure member for pinching and closing a flexible tube received within said first bore.

* * * * *